G. W. RODEBAUGH.
Saw-Mill Dog.
No. 211,790. Patented Jan. 28, 1879.
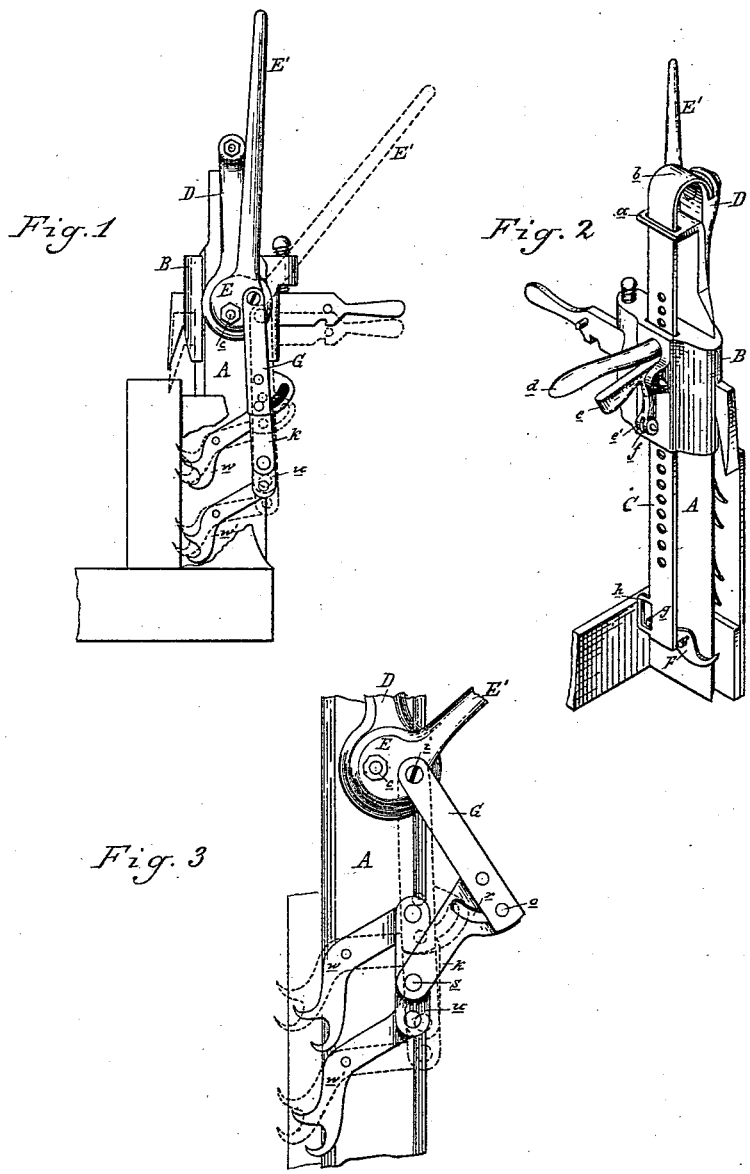
Attest:
A. Barthel
Chas. J. Hunt
Inventor:
Geo. W. Rodebaugh
By Atty
Thos. S. Sprague

UNITED STATES PATENT OFFICE.

GEORGE W. RODEBAUGH, OF DETROIT, MICHIGAN.

IMPROVEMENT IN SAW-MILL DOGS.

Specification forming part of Letters Patent No. 211,790, dated January 28, 1879; application filed October 28, 1878.

*To all whom it may concern:*

Be it known that I, GEORGE W. RODEBAUGH, of Detroit, in the county of Wayne and State of Michigan, have invented an Improvement in Saw-Mill Dogs, of which the following is a specification:

The nature of my invention relates to certain new and useful improvements in sawmill dogs, the more especially adapted to circular-saw mills, and the improvements are designed as such upon a device patented to me October 16, 1877, No. 196,102.

The invention consists, first, in the combination of devices for operating a lower dog beneath the log on the carriage; secondly, in the devices for controlling the action, as desired, of dogs laterally; and, lastly, in certain details of construction and combinations of parts, as more fully hereinafter described.

Figure 1 represents an end elevation of the invention, showing the eccentric-lever raised and the bit of the dog retracted from the log, and also, in dotted lines, the position of the parts when the bit of the dog is embedded in the log and the device locked. This view also shows the face of the knee broken away to disclose the laterally-working dogs and their connections. Fig. 2 is a perspective view taken from the side opposite to that shown in Fig. 1. Fig. 3 is a detached section, showing an enlarged view of the laterally-working dogs when retracted, and in dotted lines when protruded, and also showing the devices by means of which said dogs are brought into action, or remain inert while the vertically-working dogs are being operated.

In the accompanying drawings, which form a part of this specification, A represents a standard rising from the head-block proper, and serves as a guide for the dog head or stock B. C is a vertical, flat, and perforated bar, which passes through a correspondingly-shaped slot in the dog-head. This bar also passes through a similar slot in the overhanging head $a$ of the standard A, above which said bar is provided with a return-bend, $b$, at the termination of which it is pivotally secured to the connecting-rod D, the opposite end of which is pivotally secured to the center of the eccentric E. The eccentric is pivoted at $c$ to the rear side of the guide-standard A by a bolt, which also passes through a curved slot (not shown) in the end of the connecting-rod, which is hidden behind the eccentric, which latter is so arranged that when its arm E′ is raised to nearly a vertical position, as shown in Fig. 1, it will elevate the perforated bar carrying the dog-head, and hold the bit of the dog out of contact with the log, while a downward movement of the arm will force the bit into the log until the eccentric reaches the limit of its throw and is on its center, in which position the dog will be firmly locked, as shown in dotted lines, Fig. 1.

To vertically adjust the dog-head and secure it in position on its carrying-bar, to suit differing sizes of logs on the carriage, I employ the following devices: A rigid thumb-piece, $d$, projecting laterally from the outer face of the dog-head B, a bell-crank, $e$, pivoted immediately below the thumb-piece, and to the lower arm, $e'$, of this bell-crank is pivoted the pin $f$, which, passing through a corresponding hole in the front of the head-block, engages with any one of the perforations in the vertical bar C.

By the construction and arrangement of devices a better and less expensive method of adjustably securing the dog-head is obtained than the method described and shown in said Letter Patent, and a reference to said Letters Patent will fully describe the construction of the dog-head B, its laterally-sliding dog, and the devices which secure it in place and allow it to be protruded and retracted at pleasure.

Near the bottom of the standard A is pivoted a curved dog, F, its inner end being provided with an outwardly-projecting pin, $g$, which engages with the slot $h$ in the heel of the perforated bar C in such manner that when the eccentric is operated to throw the upper dog-bit, protruding from the dog-head, into the log, the downward movement of the bar C will force this lower dog, F, to enter the log from below, thereby dogging said log above and below, and rendering it impossible for the log to turn on the carriage. A reverse of the motion just described withdraws both the upper and lower dogs from the log simultaneously.

G is an arm pivotally secured to the eccentric at $i$, and also pivoted near its opposite end to the upper end of the strap $k$, and outside this latter pivotal point an inwardly-projecting pin, $o$, from the arm G traverses the segmental slot $r$ in the strap $k$. The lower end of this strap is pivoted at $s$ to the strap $u$, each end of which is in turn pivoted to the outer ends of the two curved dogs $w\ w'$. All these parts are so arranged that when the arm G and straps $k$ and $u$ are in vertical line, as shown in Figs. 1 and 3, the motion described to actuate the upper and lower dogs will project the laterally-working dogs $w\ w'$, which are pivoted to the guide-standard, into the side of the cant, and withdraw them. If for any cause it is not desired to use them at times, the lower end of the arm G is pushed backward, which, by means of the pin $o$ and segmental slot $r$, carries backward the upper end of the strap $k$ into the position shown in dotted lines in Fig. 3, when the upper and lower dogs may be actuated, as hereinbefore described, and the lateral dogs $w\ w'$ will remain inert.

What I claim as my invention, and desire to secure by Letters Patent, is—

1. In combination, the standard A, with eccentric E pivoted thereto, and connecting-rod D, and perforated carrying-bar C, the lower dog, F, actuated by the pin $g$ and slot $h$, substantially as and for the purposes specified.

2. The combination, with the vertically-moving bar C, connected at its upper end with the eccentric E, of the dog-head B, carried by such bar, and provided with a laterally-adjustable dog, and the pivoted dog F, having pin $g$, and operated by the slot $h$ at the lower end of the bar C, substantially as described and shown.

3. The combination, with the standard A, of the laterally-working dogs $w\ w'$, pivoted to the standard and connected with the eccentric E, pivoted to such standard above the said dogs, and the vertical carrying-bar C, operating the vertically-working dogs, and bent at its upper end, $b$, and connected to the eccentric by the rod D, substantially as described and shown.

4. In combination, the standard A, the eccentric E, pivoted thereto, the arm G, pivoted to said eccentric, the strap $k$, pivoted to said arm and provided with a segmental slot, $r$, the strap $u$, pivoted to said strap $k$, and the laterally-working dogs $w\ w'$, pivoted to said strap $u$, constructed and arranged and operating substantially as and for the purposes specified.

GEORGE W. RODEBAUGH.

Witnesses:
H. S. SPRAGUE,
CHAS. J. HUNT.